(12) United States Patent
Grooters (10) Patent No.: US 11,316,840 B2
(45) Date of Patent: Apr. 26, 2022

(54) SYSTEM AND METHOD OF UTILIZING REMOTE INFORMATION HANDLING SYSTEMS TO SECURELY STORE FILES

(71) Applicant: Dell Products L.P., Round Rock, TX (US)

(72) Inventor: Brandon Grooters, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 16/850,766

(22) Filed: Apr. 16, 2020

(65) Prior Publication Data

US 2021/0328974 A1  Oct. 21, 2021

(51) Int. Cl.
| | | |
|---|---|---|
| H04L 29/06 | (2006.01) | |
| G06F 9/455 | (2018.01) | |
| G06F 16/958 | (2019.01) | |
| H04L 9/06 | (2006.01) | |
| H04L 9/08 | (2006.01) | |

(52) U.S. Cl.
CPC ...... *H04L 63/0435* (2013.01); *G06F 9/45533* (2013.01); *G06F 16/986* (2019.01); *H04L 9/0643* (2013.01); *H04L 9/085* (2013.01)

(58) Field of Classification Search
None
See application file for complete search history.

(56) References Cited

U.S. PATENT DOCUMENTS

| 10,491,578 B1* | 11/2019 | Hebert | H04L 63/068 |
|---|---|---|---|
| 2018/0048464 A1* | 2/2018 | Lim | H04L 9/0822 |
| 2019/0372945 A1* | 12/2019 | Reynolds | H04L 9/0861 |
| 2020/0193066 A1* | 6/2020 | Johns | G06F 21/84 |
| 2020/0250254 A1* | 8/2020 | Sundberg | G06F 16/9577 |
| 2020/0250323 A1* | 8/2020 | Remington | G06F 16/972 |
| 2020/0250372 A1* | 8/2020 | Remington | H04L 67/38 |

(Continued)

OTHER PUBLICATIONS

Daniel Roth Principal Program Manager, Roth, D., 7, J., (MSFT), J., 7, A., Petropoulos, A., Salodki, D. (Feb. 19, 2019). A new experiment: Browser-based web apps with .NET and Blazor. Retrieved Jan. 27, 2021, from https://devblogs.microsoft.com/aspnet/blazor-experimental-project/, Jan. 27, 2021.

(Continued)

*Primary Examiner* — Jeffery L Williams
(74) *Attorney, Agent, or Firm* — Baker Botts L.L.P.

(57) ABSTRACT

In one or more embodiments, one or more systems, one or more methods, and/or one or more processes may: receive, by a first information handling system (IHS), one or more client files of a web application; receive a binary module; populate a document object model (DOM) with content of the web application; receive first user input via a first node of the DOM; receive an encrypted file and a first portion of a symmetric encryption key from a second IHS; receive second user input via a second node of the DOM; execute a binary module; provide the second user input to the binary module; determine a second portion of the symmetric encryption key based at least on the second user input; combine the first and second portions of the symmetric encryption key to obtain the symmetric encryption key; and decrypt the encrypted file to obtain the file.

20 Claims, 6 Drawing Sheets

(56) References Cited

U.S. PATENT DOCUMENTS

2020/0371995 A1* 11/2020 Padmanabhan ....... H04L 9/0822

OTHER PUBLICATIONS

Ben. The Problems and Promise of WebAssembly. Retrieved Jan. 27, 2021, from https://googleprojectzero.blogspot.com/2018/08/the-problems-and-promise-of-webassembly.html, Jan. 27, 2021.

Bonventre, A. (Aug. 24, 2018). The Go Blog. Retrieved Jan. 27, 2021, from https://blog.golang.org/go1.11, Aug. 24, 2018.

Build Fast, Modern Web Apps in Java. Retrieved Jan. 27, 2021, from http://teavm.org/, Jan. 27, 2021.

Foote, J. (Jun. 29, 2018). Hijacking the control flow of a WebAssembly program. Retrieved from https://www.fastly.com/blog/hijacking-control-flow-webassembly, Jun. 29, 2018.

Golang. Golang/go. Retrieved Jan. 27, 2021, from https://github.com/golang/go/wiki/WebAssembly, Jan. 27, 2021.

GopherJS. Retrieved Jan. 27, 2021, from https://github.com/gopherjs, Jan. 27, 2021.

https://emscripten.org/index.html, Jan. 27, 2021.

Igotti, N. (Nov. 16, 2017). Kotlin/Native v0.4 released: Objective-C interop, WebAssembly and more. Retrieved Jan. 27, 2021, from https://blog.jetbrains.com/kotlin/2017/11/kotlinnative-v0-4-released-objective-c-interop-webassembly-and-more/, Nov. 16, 2017.

Jordan Stewart, What languages can be compiled to WebAssembly (Wasm)? Retrieved Jan. 27, 2021, from https://stackoverflow.com/questions/43540878/what-languages-can-be-compiled-to-webassembly-or-wasm, Jan. 27, 2021.

Kexugit. Web Development—C# in the Browser with Blazor. Retrieved Jan. 27, 2021, from https://docs.microsoft.com/en-us/archive/msdn-magazine/2018/september/web-development-csharp-in-the-browser-with-blazor, Jan. 27, 2021.

Mbasso. Mbasso/awesome-wasm. Retrieved Jan. 27, 2021, from https://github.com/mbasso/awesome-wasm, Jan. 27, 2021.

McFadden, Brian, et al. "Security Chasms of WASM," BlackHat US-18 (2018), 2018.

Mirkosertic. Mirkosertic/Bytecoder. Retrieved Jan. 27, 2021, from https://github.com/mirkosertic/Bytecoder, Jan. 27, 2021.

Mozilla. Retrieved Jan. 27, 2021, from https://developer.mozilla.org/en-US/docs/Mozilla/Projects/Emscripten, Jan. 27, 2021.

Ncannasse. Ncannasse/webidl. Retrieved Jan. 27, 2021, from https://github.com/ncannasse/webidl, Jan. 27, 2021.

Oraoto. Oraoto/pib. Retrieved Jan. 27, 2021, from https://github.com/oraoto/pib, Jan. 27, 2021.

Run.rb—Run Ruby Online. Retrieved Jan. 27, 2021, from https://runrb.io/, Jan. 27, 2021.

Rust and WebAssembly. Retrieved Jan. 27, 2021, from https://github.com/rustwasm, Jan. 27, 2021.

Security. Retrieved Jan. 27, 2021, from https://webassembly.org/docs/security/, Jan. 27, 2021.

Shadaj. Shadaj/scala-native-wasm. Retrieved Jan. 27, 2021, from https://github.com/shadaj/scala-native-wasm, Jan. 27, 2021.

SteveSanderson. SteveSanderson/Blazor. Retrieved Jan. 27, 2021, from https://github.com/SteveSanderson/Blazor, Jan. 27, 2021.

Turner, A. WebAssembly is Fast: A Real-World Benchmark of WebAssembly vs. ES6. Retrieved Jan. 27, 2021, from https://medium.com/@torch2424/webassembly-is-fast-a-real-world-benchmark-of-webassembly-vs-es6-d85a23f8e193, Jan. 27, 2021.

WebAssembly. WebAssembly/design. Retrieved Jan. 27, 2021, from https://github.com/WebAssembly/design/blob/master/Security.md, Jan. 27, 2021.

Webassembly. Retrieved Jan. 27, 2021, from https://www.npmjs.com/package/webassembly, Jan. 27, 2021.

WebPerl. Retrieved Jan. 27, 2021, from https://webperl.zero-g.net/, Jan. 27, 2021.

* cited by examiner

SYSTEM AND METHOD OF UTILIZING REMOTE INFORMATION HANDLING SYSTEMS TO SECURELY STORE FILES

BACKGROUND

Field of the Disclosure

This disclosure relates generally to information handling systems and more particularly to utilizing remote information handling systems to securely store files.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by a browser executed by a first information handling system, one or more client files of a web application via a network; may receive, by the browser, a binary module via the network; may populate, by the browser, a document object model of the browser with content of the web application; may receive, by the browser, first user input via a first node of the document object model; in response to the receiving the first user input, may request, by the browser, an encrypted file and a first portion of a symmetric encryption key from a second information handling system via the network; may receive, by the browser, the encrypted file and the first portion of the symmetric encryption key from the second information handling system via the network; may receive, by the browser, second user input via a second node of the document object model; in response to receiving the second user input, may execute, by the browser, the binary module; may provide, by the browser, the second user input to the binary module; may determine, by the binary module, a second portion of the symmetric encryption key based at least on the second user input; may combine, by the binary module, the first portion of the symmetric encryption key and the second portion of the symmetric encryption key to obtain the symmetric encryption key; and may decrypt, by the binary module, the encrypted file to obtain the file.

In one or more embodiments, executing the binary module may include a virtual machine of the browser executing the binary module. In one or more embodiments, the one or more client files of the web application may include one or more of a script, a graphic, and Hypertext Markup Language (HTML) content. In one or more embodiments, the second portion of the symmetric encryption key may include a hash value. For example, determining the second portion of the symmetric encryption key based at least on the second user input may include determining, by the binary module, the hash value based at least on the second user input.

In one or more embodiments, the one or more systems, the one or more methods, and/or the one or more processes may further receive, by the browser, the second user input via a third node of the document object model. In response to receiving the second user input, the one or more systems, the one or more methods, and/or the one or more processes may further create, by the binary module, the first portion of the symmetric encryption key and may further create, by the binary module, the second portion of the symmetric encryption key based at least on the second user input. In one or more embodiments, the one or more systems, the one or more methods, and/or the one or more processes may further provide, by the first information handling system, the first portion of the symmetric encryption key to the second information handling system via the network.

In one or more embodiments, the second portion of the symmetric encryption key may include a hash value. For example, creating the second portion of the symmetric encryption key may include combining the second user input with salt data to obtain a combination of the second user input and the salt data and may include determining the hash value based at least on the combination of the second user input and the salt data. In one or more embodiments, the one or more systems, the one or more methods, and/or the one or more processes may further: create, by the first information handling system, the file; encrypt, by the binary module, the file, utilizing the symmetric encryption key and a symmetric encryption process, to produce the encrypted file; and provide, by the first information handling system, the encrypted file and the first portion of the symmetric encryption key to the second information handling system via the network.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, data protection in one or more software as a service (SaaS) solutions may be implemented without a deployed endpoint agent. The one or more SaaS solutions may require availability of cryptographic keys of end users and to a SaaS solution provider for hosted server side encryption. Further, data protection in one or more SaaS solutions without a deployed endpoint agent may require availability of an encryption key of an end user or a pass phrase of the end user on client software (e.g., a web browser) to leverage browser-based client-side data protection with one or more JavaScript implementations.

In one or more embodiments, a split cryptographic key utilization may be combined with a WebAssembly module for client-based key management, data encryption, and data decryption. A WebAssembly module may include a binary module that is downloaded, from an information handling system, as secure static content. For example, the WebAssembly module may be downloaded with other webpage content of a web application. The WebAssembly module may be executed by a client application (e.g., a web browser) in a secure sandbox. For example, a virtual machine (e.g., a stack-based virtual machine, a register-based virtual machine, etc.) of the client application may execute the WebAssembly module. Site specific content (e.g., one or more scripts, Hypertext Markup Language (HTML) content, graphics content, static content, etc.) may be downloaded with the WebAssembly module.

In one or more embodiments, plain text or cipher text may be passed to the WebAssembly module to be encrypted or decrypted in one or more solution specific workflows. One or more split key solutions may utilize a first cryptographic wrapping key that is unlocked when a second cryptographic wrapping key is available. The second cryptographic wrapping key may be available in specific security contexts. In one or more embodiments, end user data protection encryption keys may be protected by a wrapping cryptographic key, which may be unlocked with end user credentials that are not shared with a SaaS solution.

In one or more embodiments, a WebAssembly module may provide one or more advantages over native code execution and/or one or more client side scripts. For example, some advantages may include memory safety, unrealizable buffer overflows of local variables and global variables, unrealizable stack smashing (e.g., stack buffer overflow, stack buffer overrun, etc.), unrealizable data execution attacks, and control flow integrity, among others. Moreover, a WebAssembly module may be six to ten times more responsive than a client side script. For example, a client side script may be compliant with a JavaScript specification and/or an European Computer Manufacturers Association (ECMA) script specification.

In one or more embodiments, a WebAssembly module may authenticate with a cloud provider. For example, authenticating with the cloud provider may include authenticating with an information handling system of the cloud provider. The WebAssembly module may be issued credentials. For example, the credentials may be temporarily issued for a user. The WebAssembly module may receive a first portion of a cryptographic key. For example, the WebAssembly module may receive a first portion of a cryptographic key in response to providing the credentials to an information handling system. In one or more embodiments, the cryptographic key may be a symmetric cryptographic key that may be utilized in a symmetric cryptographic process. The symmetric cryptographic process may be utilized to encrypt data and to decrypt encrypted data with the symmetric cryptographic key.

In one or more embodiments, the WebAssembly module may receive user input. For example, the user input may include a pass phrase. The WebAssembly module may determine a second portion of the cryptographic key from the user input. The WebAssembly module may combine the first portion of the cryptographic key and the second portion of the cryptographic key to obtain the cryptographic key. In one or more embodiments, the WebAssembly module may receive encrypted data from a network. In one example, the encrypted data may include encrypted web content from a web server. In a second example, the encrypted data may include encrypted electronic mail (email) content from an email server. In another example, the encrypted data may include an encrypted file. The WebAssembly module may utilize the cryptographic key with a cryptographic process to obtain data from the encrypted data. For example, the WebAssembly module may decrypt, utilizing the cryptographic key, the encrypted data to obtain the data.

In one or more embodiments, the WebAssembly module may receive data. In one example, the data may include user input. In a second example, the data may include email content from a user. In another example, the data may include a file. The WebAssembly module may utilize the cryptographic process and the cryptographic key to obtain encrypted data from the data. For example, the WebAssembly module may encrypt, utilizing the cryptographic key, the data to obtain the encrypted data. The WebAssembly module may provide the encrypted data to an information handling system. For example, the WebAssembly module may provide the encrypted data to the information handling system via a network.

In one or more embodiments, the WebAssembly module may access a document object model (DOM) of a browser, and/or the DOM may access the WebAssembly module. A DOM may include a cross-platform and/or language-independent interface that treats a document as a tree data structure. In one example, the document may include a HTML document. In another example, the document may include an extensible markup language (XML) document. Each branch of the tree data structure may end in a node. Each node may include one or more objects. DOM methods may permit access to the tree data structure. For example, the WebAssembly module may utilize one or more DOM methods to change a structure, a style, and/or content of the document. In one or more embodiments, a node of the tree data structure may be associated with an event. As an example, an event may be associated with a portion of a HTML document that receives user input. For instance, the event may be triggered in response to receiving the user input. If the event is triggered, an event handler may be executed. In one example, the event handler may execute at least a portion of the WebAssembly module. In another example, at least a portion of the WebAssembly module may be executed in response to the event being triggered.

Figure 1:
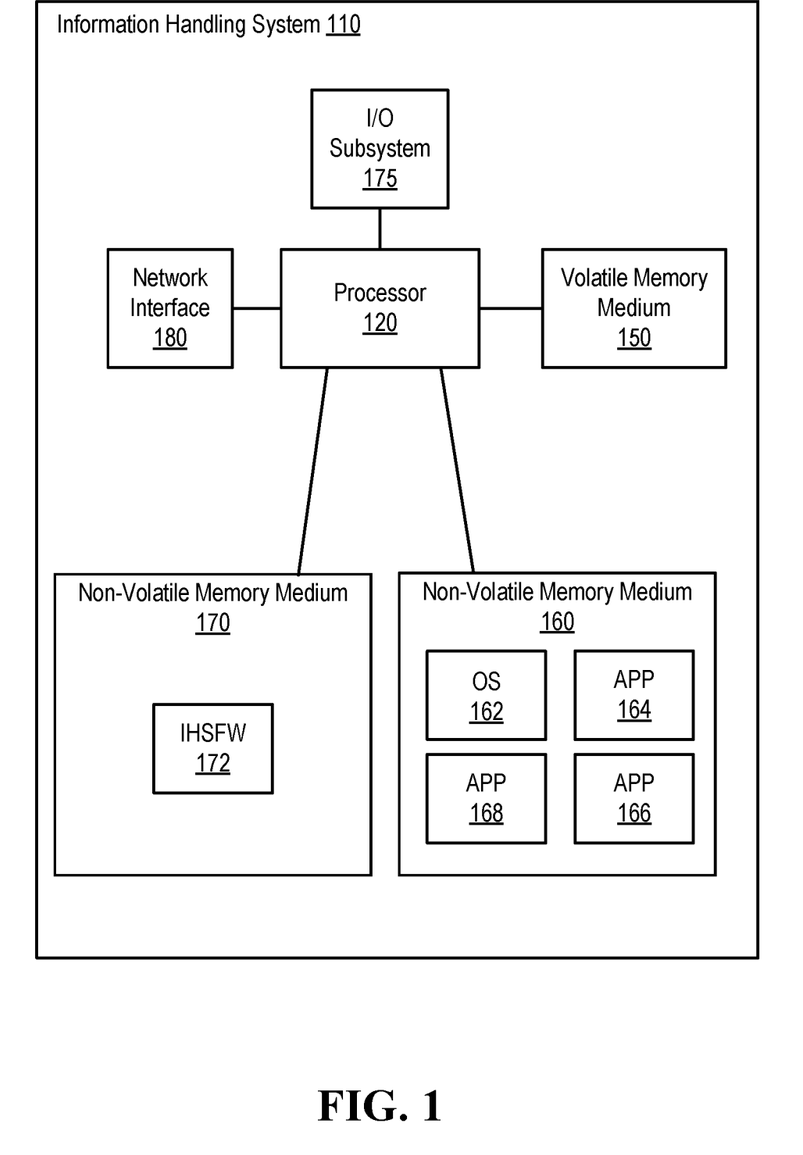
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
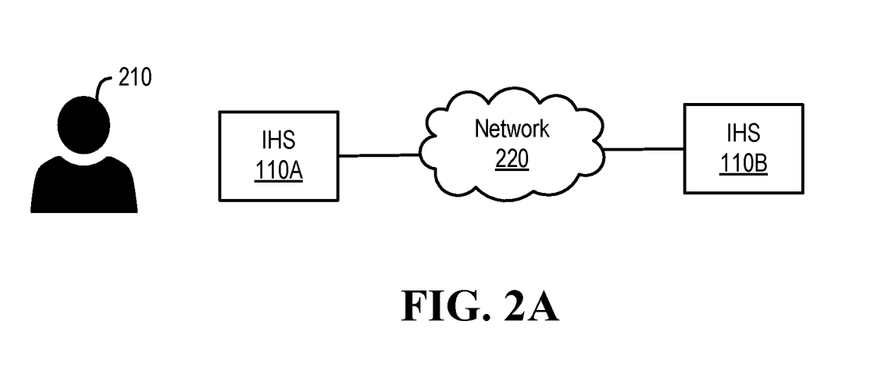
FIG. 2A illustrates an example of information handling systems coupled to a network, according to one or more embodiments.

Turning now to FIG. 2A, an example of information handling systems coupled to a network is illustrated, according to one or more embodiments. As shown, a user 210 may utilize an IHS 110A. As illustrated, IHS 110A may be coupled to a network 220. As shown, an IHS 110B may be coupled to network 220. In one or more embodiments, network 220 may include a wired network, a wireless network, an optical network, or a combination of the foregoing, among others. Network 210 may include and/or be coupled to various types of communications networks. For example, network 220 may include and/or be coupled to a local area network (LAN), a wide area network (WAN), an Internet, a public switched telephone network (PSTN), a cellular telephone network, a satellite telephone network, or a combination of the foregoing, among others. In one or more embodiments, a WAN may include a private WAN, a corporate WAN, a public WAN, or a combination of the foregoing, among others.

Figure 2B:
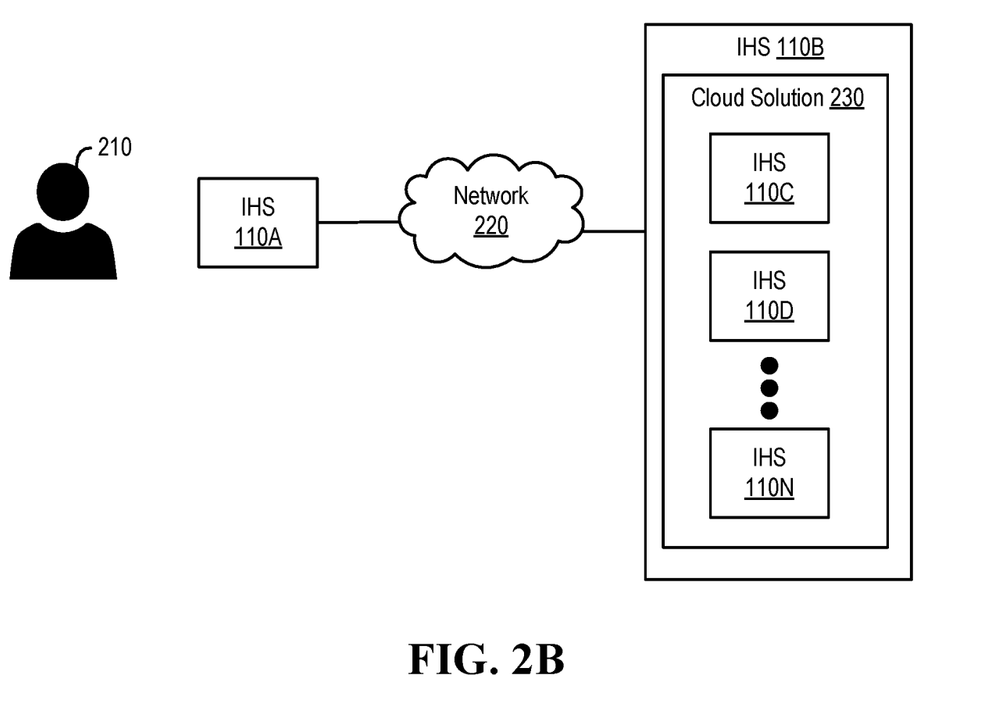
FIG. 2B illustrates another example of information handling systems coupled to a network, according to one or more embodiments.

Turning now to FIG. 2B, another example of information handling systems coupled to a network is illustrated, according to one or more embodiments. As shown, IHS 110B may include a cloud solution 230. As illustrated, cloud solution 230 may include information handling systems (IHSs) 110C-110N. Although not specifically illustrated, cloud solution 230 may include one or more memory media and/or one or more routers, according to one or more embodiments.

Figure 2C:
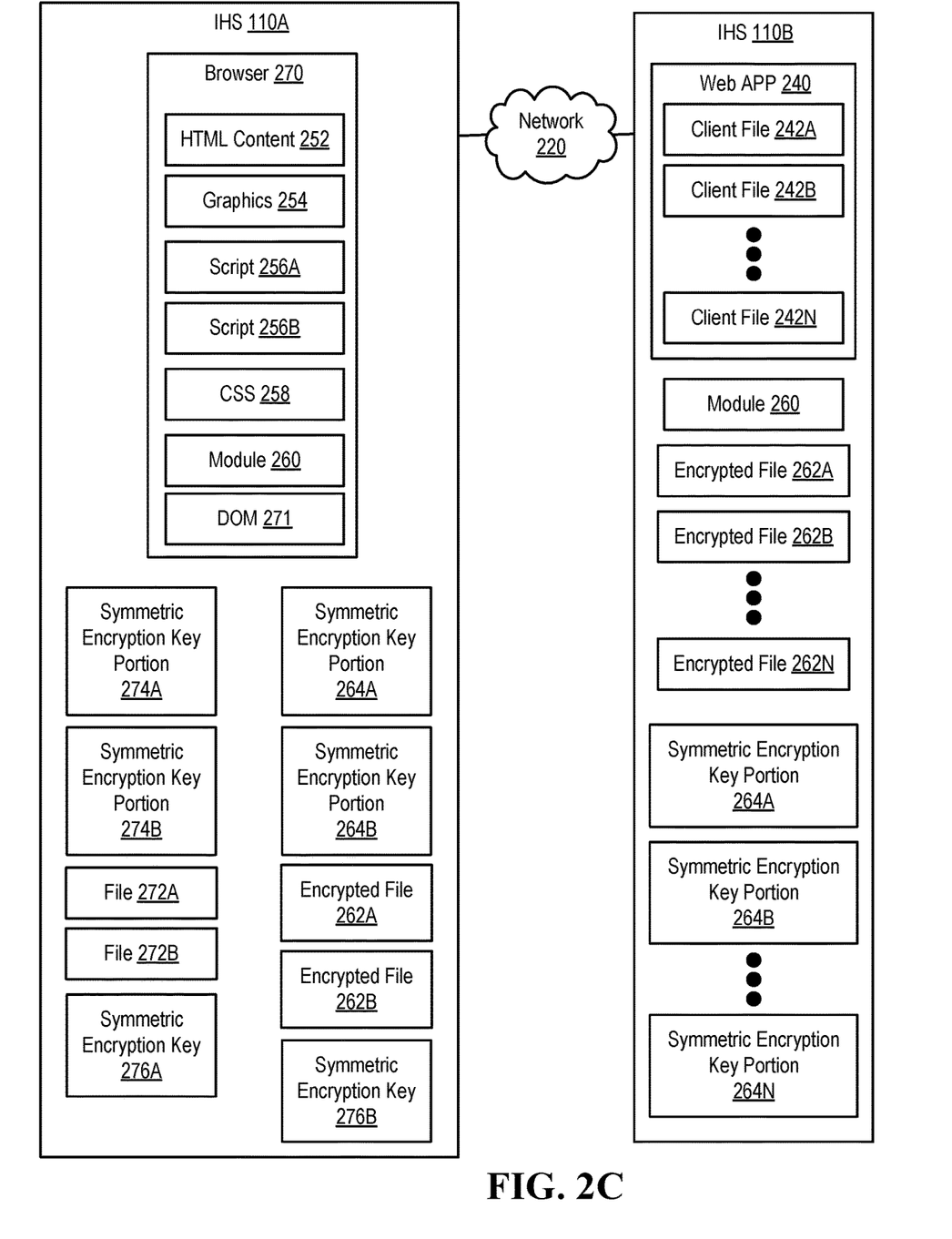
FIG. 2C illustrates an example of a utilization of web application and a module, according to one or more embodiments.

Turning now to FIG. 2C, an example of a utilization of web application and a module is illustrated, according to one or more embodiments. As shown, IHS 110B may include a web APP 240. As illustrated, web APP 240 may include client files 242A-242N. In one or more embodiments, IHS 110B may provide one or more of client files 242A-242N to IHS 110A. IHS 110A may receive the one or more of client files 242A-242N from IHS 110B. As shown, IHS 110B may include a module 260. In one or more embodiments, module 260 may include a binary module. For example, the binary module may include a WebAssembly module. In one or more embodiments, module 260 may be digitally signed. For example, module 260 may be digitally signed with a signed certificate. For instance, the signed certificate may be signed by a certificate authority. In one or more embodiments, the signed certificate may be compliant with a X.509 certificate specification.

As illustrated, IHS 110B may store encrypted files 262A-262N. As shown, IHS 110B may store symmetric encryption key portions 264A-264N. The one or more of client files 242A-242N, module 260, one or more of encrypted files 262A-262N, and/or one or more symmetric encryption key portions 264A-264N may be transferred via network 220. For example, one or more copies of the one or more of client files 242A-242N, module 260, one or more of encrypted files 262A-262N, and/or one or more symmetric encryption key portions 264A-264N may be transferred via network 220.

Figure 2D:
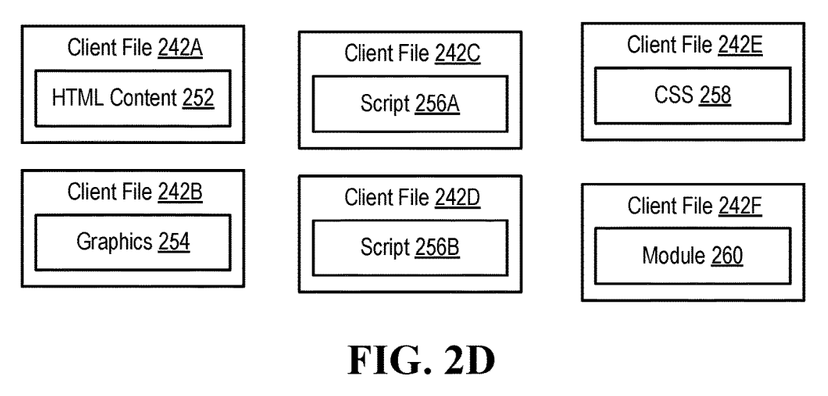
FIG. 2D illustrates an example of client files, according to one or more embodiments.

In one or more embodiments, a browser 270 may be executed by IHS 110A. Browser 270 may include a web browser. As an example, APP 164 of IHS 110A may include browser 270. Browser 270 may utilize one or more of HTML content 252, graphics 254, script 256A, script 56B, a cascading style sheet (CSS) 258, and module 260. In one or more embodiments, a script 256 may include and/or generate one or more of HTML content 252, graphics 254, and CSS 258, among others. In one or more embodiments, one or more of client files 242A-242N may include one or more of HTML content 252, graphics 254, script 256A, script 56B, CSS 258, and module 260. For example, client files 242A-242F may respectively include HTML content 252, graphics 254, script 256A, script 56B, CSS 258, and module 260, as illustrated in FIG. 2D.

As shown, IHS 110A may store files 272A and 272B. As one example, encrypted files 262A and 162B may be respectively generated from files 272A and 272B. As another example, files 272A and 272B may be respectively generated from encrypted files 262A and 162B. IHS 110A may store one or more of symmetric encryption key portions 274A, 274B, 264A, and 264A via one or more of memory media 150 and 160 of IHS 110A. A symmetric encryption key portion 264 and a symmetric encryption key portion 274 may be combined to obtain a symmetric encryption key 276. A symmetric encryption key 276 may be portioned into a symmetric encryption key portion 264 and a symmetric encryption key portion 274. A file 272 may be encrypted with a symmetric encryption key 276 to obtain an encrypted file 262. In one or more embodiments, a file 272 may be encrypted via a symmetric encryption process to obtain an encrypted file 262. For example, the symmetric encryption process may utilize a symmetric encryption key 276. An encrypted file 262 may be decrypted with a symmetric encryption key 276 to obtain a file 272. In one or more embodiments, an encrypted file 262 may be decrypted via a symmetric encryption process to obtain a file 272. For example, the symmetric encryption process may utilize a symmetric encryption key 276.

Figure 3A:
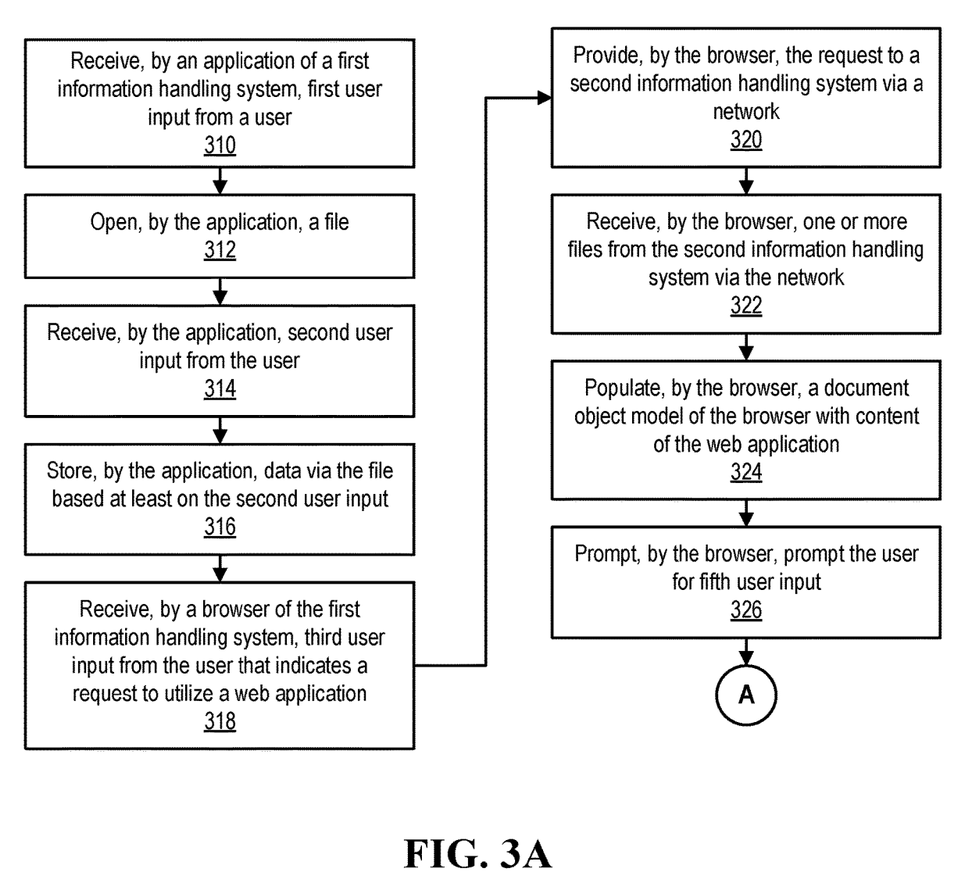
FIGS. 3A and 3B illustrate an example of a method of operating an information handling system, according to one or more embodiments.
Figure 3B:
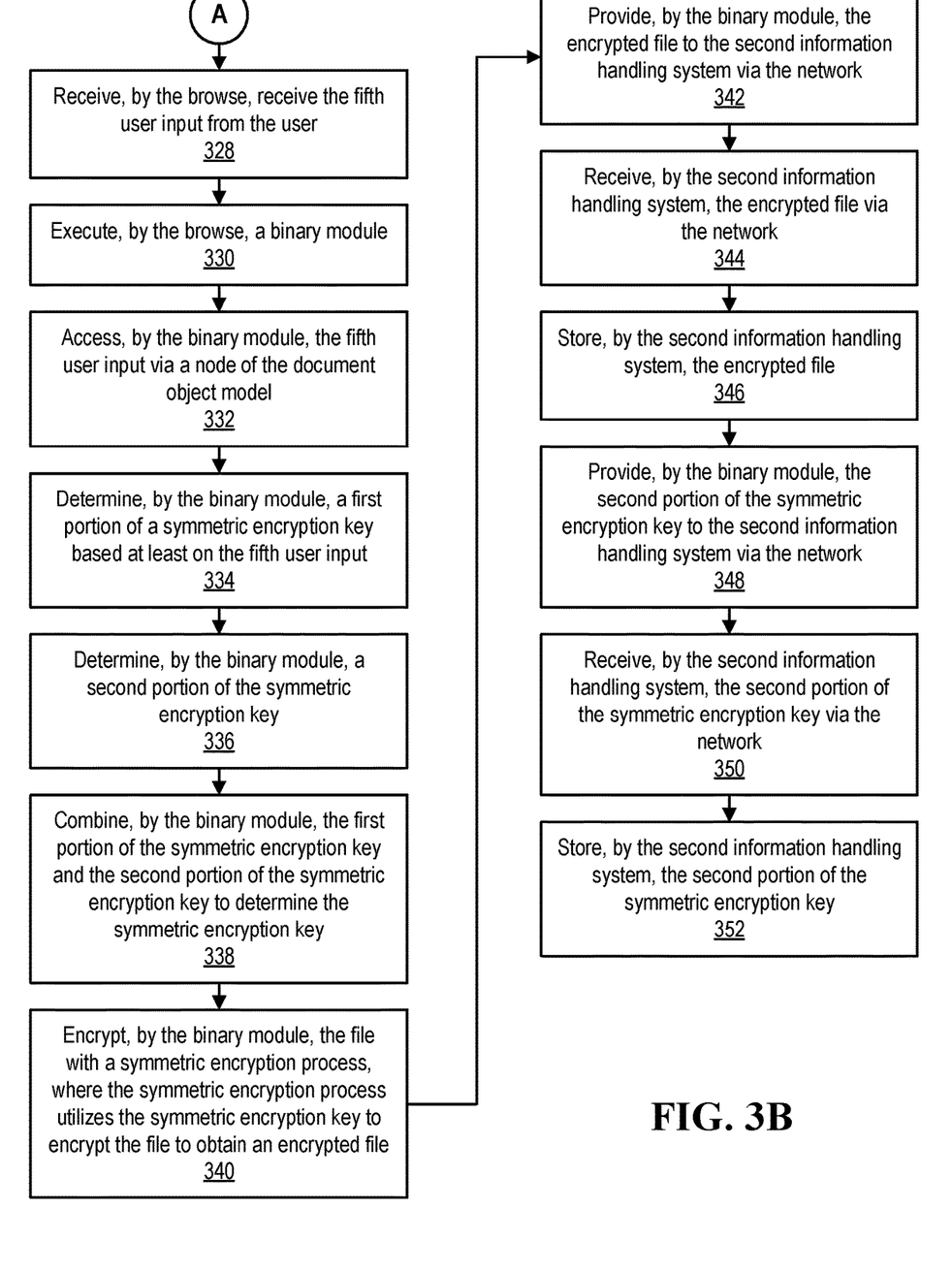

Turning now to FIGS. 3A and 3B, an example of a method of operating an information handling system is illustrated, according to one or more embodiments. At 310, an application of a first information handling system may receive first user input from a user. For example, APP 166 of IHS 110A may receive first user input from user 210. For instance, the first user input may instruct APP 166 to open file 272A. In one or more embodiments, APP 166 may include a word processing application, a spreadsheet application, a presentation application, a sound reproduction application, a video reproduction application, a video editing application, a text editing application, or an email application, among others.

At 312, the application may open the file. For example, APP 166 may open file 272A for reading and/or writing. In one or more embodiments, opening the file may include creating the file. For example, if file 272A does not yet exist, APP 166 may create file 272A. APP 166 may create file 272A for reading and/or writing. At 314, the application may receive second user input from the user. For example, APP 166 may receive second user input from user 210. At 316, the application may store data via the file based at least on the second user input. For example, APP 166 may store data via the file based at least on the second user input.

At 318, a browser of the first information handling system may receive third user input from the user that indicates a request to utilize a web application. For example, browser 270 may receive third user input from user 210 that indicates a request to utilize web APP 240. At 320, the browser may provide the request to a second information handling system via a network. For example, browser 270 may provide the request to IHS 110B via network 220. For instance, browser 270 may provide the request to a web server executed by IHS 110B.

At 322, the browser may receive one or more files from the second information handling system via the network. For example, browser 270 may receive one or more of client files 242A-242N of web APP 240 from IHS 110B via network 220. For instance, browser 270 may receive, via network 220, one or more of client files 242A-242N from the web server executed by IHS 110B. At 322, the browser may populate a document object model of the browser with content of the web application. For example, browser 270 may populate DOM 271 with content of web APP 240. For instance, the content of web APP 240 may include one or more of HTML content 252, graphics 254, script 256A, script 56B, CSS 258, and module 260, among others.

At 324, the browser may receive fourth user input, from the user, that indicates the file is to be encrypted and provided to the second information handling system. For example, browser 270 may receive fourth user input, from user 210, that indicates file 272A is to be encrypted and provided to IHS 110B. At 326, the browser may prompt the user for fifth user input. For example, browser 270 may prompt the user for fifth user input. For instance, the fifth user input may include a pass phrase (e.g., user input via a keyboard). At 328, the browser may receive the fifth user input from the user. For example, browser 270 may receive the fifth user input from user 210.

At 330, the browser may execute a binary module. For example, browser 270 may execute module 260. For instance, module 260 may include a WebAssembly module. In one or more embodiments, browser 270 may include a virtual machine. For example, browser 270 may execute module 260 via the virtual machine. For instance, the virtual machine may execute byte code of module 260. In one or more embodiments, an ISA of the virtual machine may be different from an ISA of IHS 110A. In one or more embodiments, the byte code may include obfuscated byte code. At 332, the binary module may access the fifth user input via a node of the document object model. For example, module 260 may access the fifth user input via a node of DOM 271.

At 334, the binary module may determine a first portion of a symmetric encryption key based at least on the fifth user input. For example, module 260 may determine symmetric encryption key portion 274A based at least on the fifth user input. In one or more embodiments, the first portion of the symmetric encryption key may include a hash value from a one-way hash function. In one example, input to the one-way hash function may include the fifth user input. In another example, input to the one-way hash function may include the fifth user input and salt data. For instance, the salt data may include random data (e.g., a random number, random text, etc.). In one or more embodiments, input to the one-way hash function may include a combination of the fifth user input and the salt data.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or may said to be strengthened.

At 336, the binary module may determine a second portion of the symmetric encryption key. For example, module 260 may determine symmetric encryption key portion 274B. For instance, module 260 may determine symmetric encryption key portion 274B via a process that generates portions of symmetric encryption keys. In one or more embodiments, the process that generates portions of symmetric encryption keys may generate random data for the portions of symmetric encryption keys. In one example, random data for a portion of a symmetric encryption key may include a random number. In another example, random data for a portion of a symmetric encryption key may include random text. In one or more embodiments, the process that generates portions of symmetric encryption keys may generate a hash value of the random data. For example, a second portion of the symmetric encryption key may include the hash value of the random data. For instance, symmetric encryption key portion 274B may include the hash value of the random data.

At 338, the binary module may combine the first portion of the symmetric encryption key and the second portion of the symmetric encryption key to determine the symmetric encryption key. For example, module 260 may combine symmetric encryption key portion 274A and symmetric encryption key portion 274B to determine symmetric encryption key 276A.

At 340, the binary module may encrypt the file with a symmetric encryption process, where the symmetric encryption process utilizes the symmetric encryption key to encrypt the file to obtain an encrypted file. For example, module 260 may encrypt file 272A with a symmetric encryption process, where the symmetric encryption process utilizes symmetric encryption key 276A to encrypt file 272A to obtain encrypted file 262A.

At 342, the binary module may provide the encrypted file to the second information handling system via the network. For example, module 260 may provide encrypted file 262A to IHS 110B via network 220. At 344, the second information handling system may receive the encrypted file via the network. For example, IHS 110B may receive encrypted file 262A via network 220. At 346, the second information handling system may store the encrypted file. For example, IHS 110B may store encrypted file 262A.

At 348, the binary module may provide the second portion of the symmetric encryption key to the second information handling system via the network. For example, module 260 may provide encryption key portion 274B to IHS 110B via network 220. At 350, the second information handling system may receive the second portion of the symmetric encryption key via the network. For example, IHS 110B may receive symmetric encryption key portion 274B via network 220. At 352, the second information handling system may store the second portion of the symmetric encryption key. For example, IHS 110B may store symmetric encryption key portion 274B.

Figure 4:
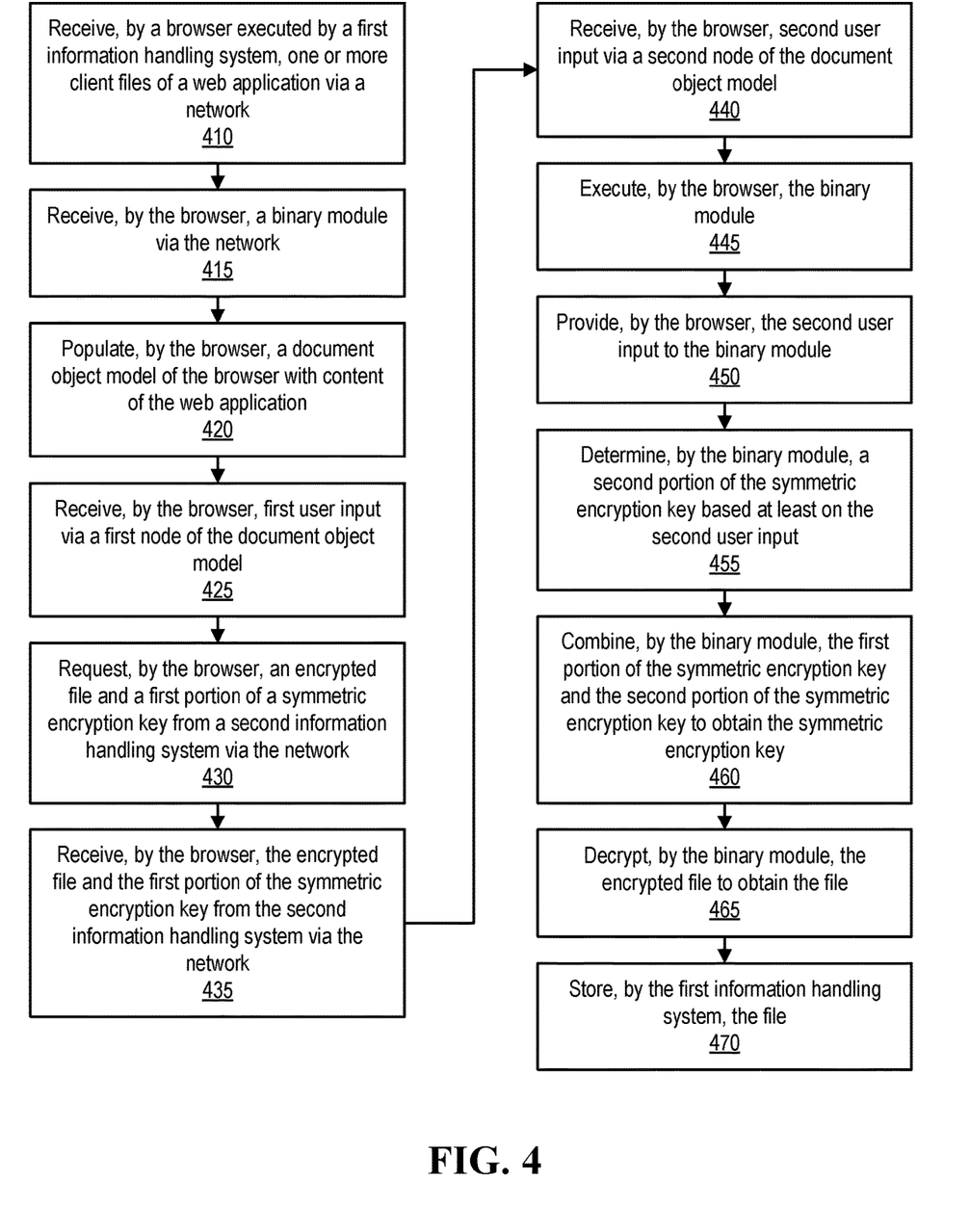
FIG. 4 illustrates another example of a method of operating an information handling system, according to one or more embodiments.

Turning now to FIG. 4, another example of a method of operating an information handling system is illustrated, according to one or more embodiments. At 410, a browser executed by a first information handling system may receive one or more client files of a web application via a network. For example, browser 270, executed by IHS 110A, may receive one or more of client files 242A-242N of web APP 240 via network 220.

At 415, the browser may receive a binary module via the network. For example, browser 270 may receive module 260 via network 220. At 420, the browser may populate a document object model of the browser with content of the web application. For example, browser 270 may populate DOM 271 with content of web APP 240. For instance, the content of web APP 240 may include one or more of HTML content 252, graphics 254, script 256A, script 56B, CSS 258, and module 260, among others.

At 425, the browser may receive first user input via a first node of the document object model. For example, browser 270 may receive first user input via a first node of DOM 271. For instance, user 210 may provide the first user input. In one or more embodiments, the first user input may include a request to utilize a file stored as an encrypted file via the second information handling system. For example, the first user input may include a request to utilize file 272A stored as encrypted file 262A via IHS 110B.

At 430, the browser may request an encrypted file and a first portion of a symmetric encryption key from a second information handling system via the network. For example, browser 270 may request encrypted file 262A and symmetric encryption key portion 264A from IHS 110B via network 220. In one or more embodiments, requesting, by the browser, the encrypted file and the first portion of the symmetric encryption key from the second information handling system via the network may be performed in response to receiving the first user input. In one or more embodiments, requesting, by the browser, the encrypted file and the first portion of the symmetric encryption key from the second information handling system via the network may include providing a request for the encrypted file and the first portion of the symmetric encryption key to the second information handling system via the network.

At 435, the browser may receive the encrypted file and the first portion of the symmetric encryption key from the second information handling system via the network. For example, browser 270 may receive encrypted file 262A and symmetric encryption key portion 264A from IHS 110B via network 220.

At 440, the browser may receive second user input via a second node of the document object model. For example, browser 270 may receive second user input via a second node of DOM 271. For instance, user 210 may provide the second user input. At 445, the browser may execute the binary module. For example, browser 270 may execute module 260. In one or more embodiments, executing the binary module may be performed in response to receiving the second user input. In one or more embodiments, the binary module may be executed without a just-in-time (JIT) compiler. For example, module 210 may be executed without compiling to native code of processor 120 of IHS 110A.

In one or more embodiments, executing the binary module may include a virtual machine of the browser executing the binary module. For example, the binary module may include a WebAssembly module that may be executed by a virtual machine of browser 270. In one or more embodiments, the binary module may be authenticated via a digital signature associated with the binary module. For example, the digital signature may be authenticated via a signed certificate. For instance, the signed certificate may be signed by a certificate authority. In one or more embodiments, if the binary module may is not authenticated, the browser may not execute the binary module.

At 450, the browser may provide the second user input to the binary module. For example, browser 270 may provide the second user input to module 260. In one or more embodiments, the browser may provide the second user input to the binary module via a second node of the document object model. For example, browser 270 may provide the second user input to module 260 via a second node of DOM 271. For instance, module 260 may access the second node of DOM 271 to obtain the second user input.

At 455, the binary module may determine a second portion of the symmetric encryption key based at least on the second user input. For example, module 260 may determine symmetric encryption key portion 274A based at least on the second user input. For instance, the second user input may include a pass phrase (e.g., user input via a keyboard). In one or more embodiments, the first portion of the symmetric encryption key may include a hash value from a one-way hash function. In one example, input to the one-way hash function may include the second user input. In another example, input to the one-way hash function may include the second user input and salt data. For instance, the salt data may include random data (e.g., a random number, random text, etc.). In one or more embodiments, input to the one-way hash function may include a combination of the second user input and the salt data.

At 460, the binary module may combine the first portion of the symmetric encryption key and the second portion of the symmetric encryption key to obtain the symmetric encryption key. For example, module 260 may combine symmetric encryption key portion 264A and symmetric encryption key portion 274A to obtain symmetric encryption key portion 276A.

At 465, the binary module may decrypt the encrypted file with the symmetric encryption key to obtain the file. For example, module 260 may decrypt encrypted file 262A with symmetric encryption key 276A to obtain file 272A. In one or more embodiments, decrypting the encrypted file to obtain the file may include decrypting the encrypted file to obtain the file via a symmetric encryption process. For example, the symmetric encryption process may utilize symmetric encryption key 276A to decrypt encrypted file 262A to obtain file 272A.

At 470, the file may be stored by the first information handling system. For example, IHS 110A may store file 272A via one or more memory media 150 and 160, among others, of IHS 110A. For instance, APP 166 may utilize file 272A after file 272A is stored. As an example, APP 166 may include a word processing application, a spreadsheet application, a presentation application, a sound reproduction application, a video reproduction application, a video editing application, a text editing application, or an email application, among others. In one or more embodiments, utilizing the file may include one or more of retrieving data from the file, modifying data of the file, removing data from the file, and adding data to the file, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    at least one processor; and
    a memory medium, coupled to the at least one processor, that stores instructions executable by the at least one processor, which when executed by the at least one processor, cause the information handling system to:
        receive, by a browser executed by the information handling system, one or more client files of a web application via a network;
        receive, by the browser, a binary module via the network;
        populate, by the browser, a document object model of the browser with content of the web application;
        receive, by the browser, first user input via a first node of the document object model;
        in response to receiving the first user input, request, by the browser, an encrypted file and a first portion of a symmetric encryption key from another information handling system via the network;

receive, by the browser, the encrypted file and the first portion of the symmetric encryption key from the other information handling system via the network;

receive, by the browser, second user input via a second node of the document object model;

in response to receiving the second user input, execute, by the browser, the binary module;

provide, by the browser, the second user input to the binary module;

determine, by the binary module, a second portion of the symmetric encryption key based at least on the second user input;

combine, by the binary module, the first portion of the symmetric encryption key and the second portion of the symmetric encryption key to obtain the symmetric encryption key; and decrypt, by the binary module, the encrypted file with the symmetric encryption key to obtain the file.

2. The information handling system of claim 1, wherein, to execute the binary module, the instructions further cause the information handling system to execute a virtual machine of the browser to execute the binary module.

3. The information handling system of claim 1, wherein the instructions further cause the information handling system to:

receive, by the browser, the second user input via a third node of the document object model;

in response receiving the second user input:
create, by the binary module, the first portion of the symmetric encryption key; and
create, by the binary module, the second portion of the symmetric encryption key based at least on the second user input; and
provide the first portion of the symmetric encryption key to the other information handling system via the network.

4. The information handling system of claim 3, wherein the second portion of the symmetric encryption key includes a hash value; and wherein, to create the second portion of the symmetric encryption key, the instructions further cause the information handling system to:
combine the second user input with salt data to obtain a combination of the second user input and the salt data; and
determine the hash value based at least on the combination of the second user input and the salt data.

5. The information handling system of claim 1, wherein the instructions further cause the information handling system to:

create the file;

encrypt, by the binary module, the file, utilizing the symmetric encryption key and a symmetric encryption process, to produce the encrypted file; and provide the encrypted file and the first portion of the symmetric encryption key to the other information handling system via the network.

6. The information handling system of claim 1, wherein the one or more client files of the web application include one or more of a script, a graphic, and Hypertext Markup Language (HTML) content.

7. The information handling system of claim 1, wherein the second portion of the symmetric encryption key includes a hash value; and wherein, to determine the second portion of the symmetric encryption key based at least on the second user input, the instructions further cause the information handling system to determine, by the binary module, the hash value based at least on the second user input.

8. A method, comprising:

receiving, by a browser executed by a first information handling system, one or more client files of a web application via a network;

receiving, by the browser, a binary module via the network;

populating, by the browser, a document object model of the browser with content of the web application;

receiving, by the browser, first user input via a first node of the document object model;

in response to the receiving the first user input, requesting, by the browser, an encrypted file and a first portion of a symmetric encryption key from a second information handling system via the network;

receiving, by the browser, the encrypted file and the first portion of the symmetric encryption key from the second information handling system via the network;

receiving, by the browser, second user input via a second node of the document object model;

in response to the receiving the second user input, executing, by the browser, the binary module;

providing, by the browser, the second user input to the binary module;

determining, by the binary module, a second portion of the symmetric encryption key based at least on the second user input;

combining, by the binary module, the first portion of the symmetric encryption key and the second portion of the symmetric encryption key to obtain the symmetric encryption key; and decrypting, by the binary module, the encrypted file with the symmetric encryption key to obtain the file.

9. The method of claim 8, wherein the executing the binary module includes a virtual machine of the browser executing the binary module.

10. The method of claim 8, further comprising:

receiving, by the browser, the second user input via a third node of the document object model;

in response the receiving the second user input:
creating, by the binary module, the first portion of the symmetric encryption key; and
creating, by the binary module, the second portion of the symmetric encryption key based at least on the second user input; and
providing, by the first information handling system, the first portion of the symmetric encryption key to the second information handling system via the network.

11. The method of claim 10, wherein the second portion of the symmetric encryption key includes a hash value; and wherein the creating the second portion of the symmetric encryption key includes:
combining the second user input with salt data to obtain a combination of the second user input and the salt data; and
determining the hash value based at least on the combination of the second user input and the salt data.

12. The method of claim 8, further comprising:

creating, by the first information handling system, the file;

encrypting, by the binary module, the file, utilizing the symmetric encryption key and a symmetric encryption process, to produce the encrypted file; and providing, by the first information handling system, the encrypted file and the first portion of the symmetric encryption key to the second information handling system via the network.

13. The method of claim 8, wherein the one or more client files of the web application include one or more of a script, a graphic, and Hypertext Markup Language (HTML) content.

14. The method of claim 8,
wherein the second portion of the symmetric encryption key includes a hash value; and
wherein the determining the second portion of the symmetric encryption key based at least on the second user input includes determining, by the binary module, the hash value based at least on the second user input.

15. A computer-readable non-transitory memory medium that includes instructions that, when executed by at least one processor of an information handling system, cause the information handling system to:
receive, by a browser executed by the information handling system, one or more client files of a web application via a network;
receive, by the browser, a binary module via the network;
populate, by the browser, a document object model of the browser with content of the web application;
receive, by the browser, first user input via a first node of the document object model;
in response to receiving the first user input, request, by the browser, an encrypted file and a first portion of a symmetric encryption key from another information handling system via the network;
receive, by the browser, the encrypted file and the first portion of the symmetric encryption key from the other information handling system via the network;
receive, by the browser, second user input via a second node of the document object model;
in response to receiving the second user input, execute, by the browser, the binary module;
provide, by the browser, the second user input to the binary module;
determine, by the binary module, a second portion of the symmetric encryption key based at least on the second user input;
combine, by the binary module, the first portion of the symmetric encryption key and the second portion of the symmetric encryption key to obtain the symmetric encryption key; and decrypt, by the binary module, the encrypted file with the symmetric encryption key to obtain the file.

16. The computer-readable non-transitory memory medium of claim 15, wherein, to execute the binary module, the instructions further cause the information handling system to execute a virtual machine of the browser to execute the binary module.

17. The computer-readable non-transitory memory medium of claim 15, wherein the instructions further cause the information handling system to:
receive, by the browser, the second user input via a third node of the document object model;
in response receiving the second user input:
create, by the binary module, the first portion of the symmetric encryption key; and
create, by the binary module, the second portion of the symmetric encryption key based at least on the second user input; and
provide the first portion of the symmetric encryption key to the other information handling system via the network.

18. The computer-readable non-transitory memory medium of claim 17,
wherein the second portion of the symmetric encryption key includes a hash value; and
wherein, to create the second portion of the symmetric encryption key, the instructions further cause the information handling system to:
combine the second user input with salt data to obtain a combination of the second user input and the salt data; and
determine the hash value based at least on the combination of the second user input and the salt data.

19. The computer-readable non-transitory memory medium of claim 15, wherein the instructions further cause the information handling system to:
create the file;
encrypt, by the binary module, the file, utilizing the symmetric encryption key and a symmetric encryption process, to produce the encrypted file; and
provide the encrypted file and the first portion of the symmetric encryption key to the other information handling system via the network.

20. The computer-readable non-transitory memory medium of claim 15, wherein the one or more client files of the web application include one or more of a script, a graphic, and Hypertext Markup Language (HTML) content.

* * * * *